United States Patent [19]
Devall et al.

[11] Patent Number: 6,056,029
[45] Date of Patent: May 2, 2000

[54] FUEL-TRANSFER SYSTEM

[75] Inventors: Jeffrey Devall, Liberty; Brian J. Williamson, Hagerstown; Steven E. Groll, Connersville; Barry A. Beyer, Richmond, all of Ind.

[73] Assignee: Stant Manufacturing Inc., Connersville, Ind.

[21] Appl. No.: 09/261,350

[22] Filed: Mar. 3, 1999

[51] Int. Cl.[7] ........................................ B65B 1/04
[52] U.S. Cl. ................... 141/383; 141/301; 141/323; 141/347; 141/348; 220/86.2; 137/151; 137/493.4; 137/493.5; 137/588
[58] Field of Search ...................... 141/301, 302, 141/307, 323, 347, 348, 349, 350, 383; 220/86.2, 746, 725; 137/151, 493.3, 493.4, 493.5, 493.6, 493.9, 588; 251/149.6

[56] References Cited

U.S. PATENT DOCUMENTS

| | | |
|---|---|---|
| 3,633,609 | 1/1972 | Benner et al. ........................ 220/86.2 |
| 3,866,638 | 2/1975 | Mingus et al. . |
| 3,938,564 | 2/1976 | Jones . |
| 4,638,832 | 1/1987 | Mokveld . |
| 4,651,889 | 3/1987 | Uranishi et al. . |
| 4,714,172 | 12/1987 | Morris . |
| 4,917,157 | 4/1990 | Gifford et al. ........................ 137/588 |
| 4,944,779 | 7/1990 | Szlaga et al. ........................ 220/86.2 |
| 4,974,645 | 12/1990 | Johnson . |
| 5,056,570 | 10/1991 | Harris et al. . |
| 5,271,438 | 12/1993 | Griffin et al. . |
| 5,439,129 | 8/1995 | Buechler ........................ 141/302 |
| 5,568,828 | 10/1996 | Harris . |
| 5,730,194 | 3/1998 | Foltz . |
| 6,000,426 | 12/1999 | Tuckey et al. ........................ 137/588 |

*Primary Examiner*—Stevn O. Douglas
*Assistant Examiner*—Khoa Huynh
*Attorney, Agent, or Firm*—Barnes & Thornburg

[57] ABSTRACT

A fuel-transfer system is provided for a fuel system of a vehicle. The fuel-transfer system includes a filler neck and a fuel tank having top and bottom walls. The fuel-transfer system includes a tube and a fuel conductor. The fuel conductor includes a housing and a diverter valve positioned to lie in the housing. The diverter valve is configured to intercept and guide the tube through an outlet of the housing into a fuel tank.

36 Claims, 10 Drawing Sheets

FUEL-TRANSFER SYSTEM

BACKGROUND AND SUMMARY OF THE INVENTION

This invention relates to a fuel system, and particularly to a fuel-transfer system. More particularly, this invention relates to a vehicle filler neck and a valve for regulating flow of liquid fuel and fuel vapor between the vehicle filler neck and a vehicle fuel tank.

A filler neck is a tube which conducts liquid fuel from a fuel-dispensing pump nozzle to an interior fuel-storage region in a fuel tank. Although an opened passageway through the filler neck into the fuel tank is needed during refueling to conduct liquid fuel from the pump nozzle into the fuel tank, it is desirable to close the filler neck at other times to block discharge of liquid fuel and fuel vapor from the fuel tank through the filler neck. However, if the pressure of fuel vapor in the fuel tank reaches a predetermined level, it is desirable to relieve the pressure in the fuel tank by venting pressurized fuel vapor from the fuel tank to the filler neck for discharge therefrom.

On occasion, it is necessary for mechanics to remove liquid fuel from the fuel tank during maintenance or repair of a vehicle. To remove the liquid fuel, a mechanic or other individual often inserts a siphon tube through the filler neck into the fuel tank and siphons or otherwise pumps the liquid fuel from the fuel tank.

According to the present invention, a fuel-transfer system includes a fuel tank and a fuel conductor coupled to the fuel tank. The fuel conductor includes a housing having a fuel-transfer channel and a diverter valve positioned to lie in the fuel-transfer channel. The diverter valve is movable from a first position blocking the flow of fuel vapor or liquid fuel through the channel to a second position permitting the flow of fuel vapor or liquid fuel through the channel. The diverter valve includes a guide surface adapted to intercept and divert a siphon tube moving in a fuel tank filler neck and guide it toward a bottom wall of the fuel tank.

In preferred embodiments, the diverter valve further includes a pressure-relief valve. The pressure-relief valve is movable between a first position blocking the flow of fuel vapor through the diverter valve to a second position permitting the flow of fuel vapor through the diverter valve and the fuel-transfer system. The pressure-relief valve moves to the second position when fuel vapor pressure levels in the fuel tank reach a predetermined level to relieve pressure in the fuel tank.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying Figures in which:

FIG. 6a is a perspective assembly view of an embodiment of the fuel conductor including a housing (shown in the dashed boxes) and a diverter valve (shown in the largest bracket), the housing including a mounting member (shown in the upper left-hand dashed box) adapted to be coupled to the filler neck, an inner housing member (shown in the upper right-hand dashed box) arranged to be coupled to the mounting member, and a retainer member (shown in the lower left-hand dashed box) arranged to be coupled to the inner housing member to capture the diverter valve within the inner housing member, the diverter valve including a valve member (shown in the intermediate bracket) and a spring, the inner housing member including a fuel-transfer channel and a fuel-transfer aperture and the valve member including a scoop-shaped guide member, a disk-shaped seal, a cup-shaped shuttle member, and a pressure-relief valve (shown in the smallest bracket);

FIGS. 11a–11d show another embodiment of the scoop-shaped guide member and shuttle member illustrated in FIGS. 6a–6e;

DETAILED DESCRIPTION OF THE DRAWINGS

Figure 1:
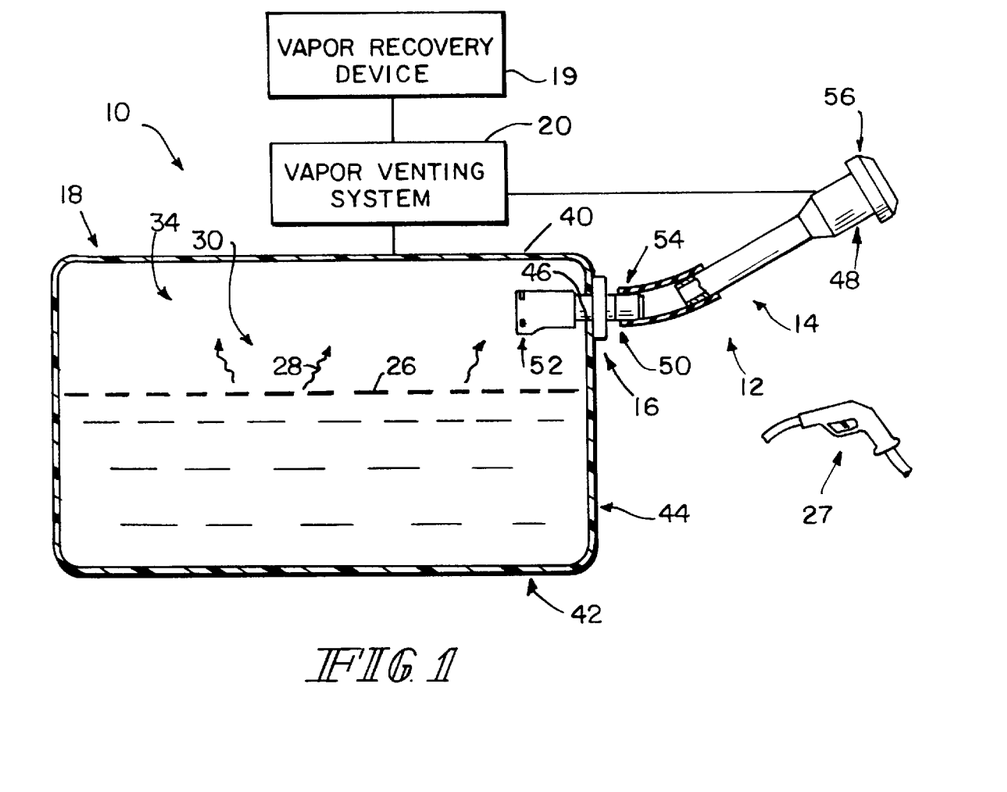
FIG. 1 is a diagrammatic view of a vehicle fuel system having a vapor venting system and a fuel-transfer system including a filler neck, a fuel conductor in accordance with the present invention, and a fuel tank, the fuel conductor being positioned in the fuel tank and filler neck to regulate the transfer of liquid fuel and fuel vapor between the fuel tank and the filler neck.
Figure 5:
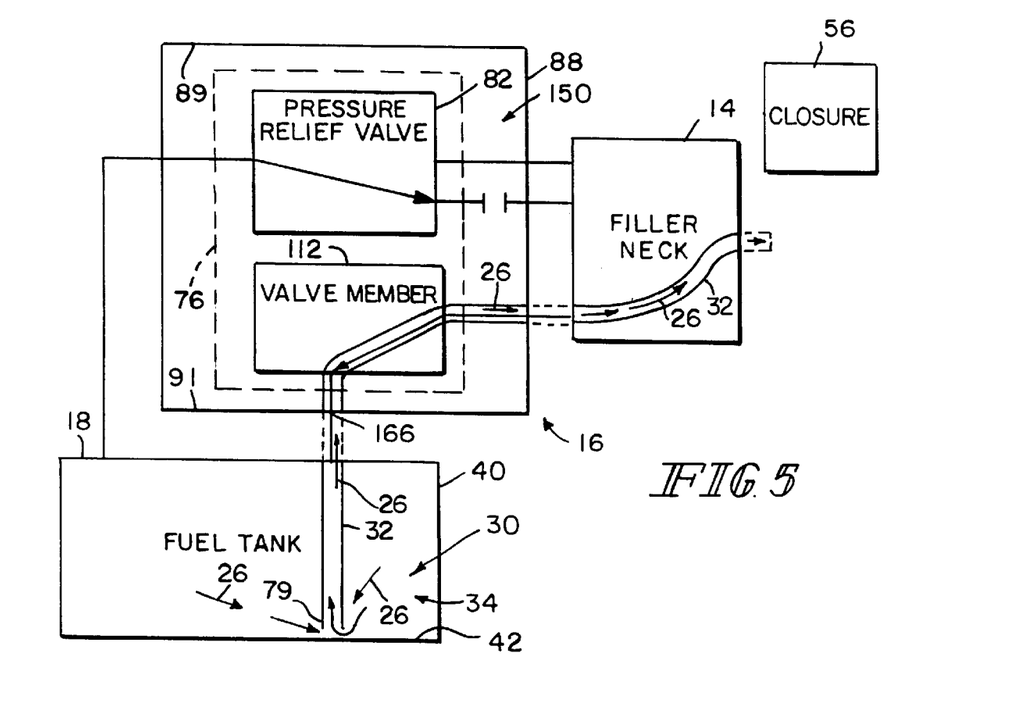
FIG. 5 is a view similar to FIG. 2 showing the valve member moved to the opened position while a siphon tube is inserted through the now-opened filler neck (i.e., the closure has been removed) and housing into the fuel tank and showing the valve member engaging the siphon tube and directing it toward a bottom wall of the fuel tank so that liquid fuel can be removed by a mechanic or other individual using the siphon tube.

A fuel system 10 for use with a vehicle is shown in FIG. 1. Fuel system 10 includes a fuel tank 18, a vapor-venting system 20 coupled to fuel tank 18 and to a vapor-recovery device 19, and a fuel-transfer system 12 including a filler neck 14 and a fuel conductor 16 coupled to filler neck 14 and coupled to fuel tank 18 to intercept liquid fuel flowing through filler neck 14 into fuel tank 18. Filler neck 14 conducts liquid fuel 26 to fuel conductor 16 which regulates the flow of liquid fuel 26 and fuel vapor 28 between filler neck 14 and an interior region 30 of fuel tank 18 and intercepts and guides a siphon tube 32, as shown in FIG. 5, inserted into fuel conductor 16 from filler neck 14 into interior region 30 of fuel tank 18. Vapor venting system 20 regulates venting of fuel vapor 28 extant in a vapor space 34 in interior region 30 of fuel tank 18 to vapor-recovery device 19.

Fuel tank 18 includes a top wall 40, a bottom wall 42 spaced apart from top wall 40, and a side wall 44 including an inlet aperture 46 as shown in FIG. 1. Fuel conductor 16 is mounted to side wall 44 and arranged to extend or be extended through inlet aperture 46 as shown in FIG. 1. Filler neck 14 includes a mouth 48 at an outer end and a discharge outlet 50 at an inner end. Fuel conductor 16 has an outer end 54 coupled to discharge outlet 50 of filler neck 14 and an inner end 52 arranged to extend into interior region 30 of fuel tank 18. Mouth 48 is formed to receive a fuel-dispensing pump nozzle 27 during tank refueling and a closure 56 at all times other than refueling.

Figure 2:
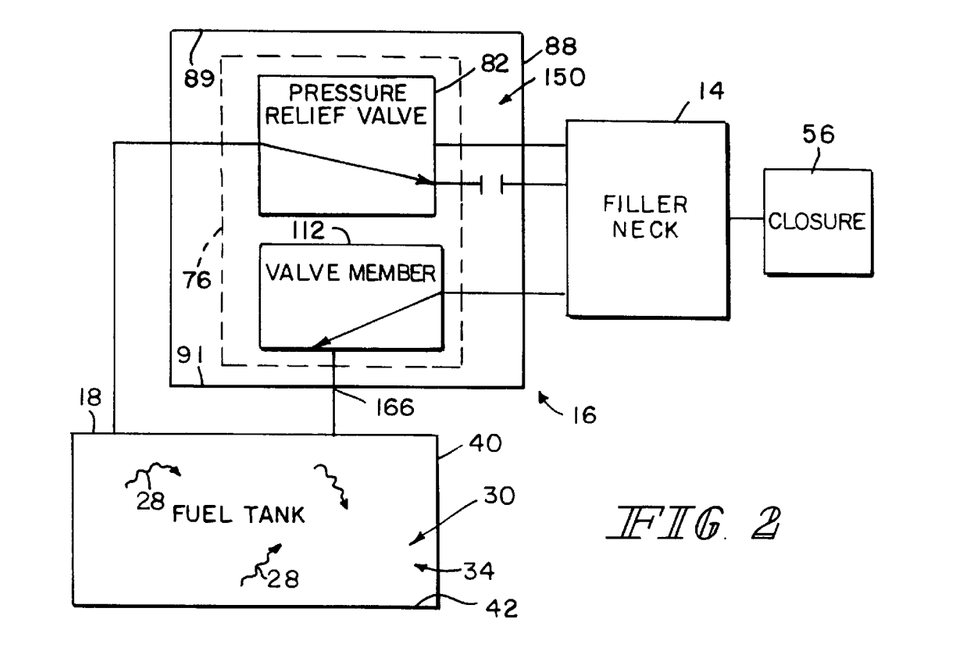
FIG. 2 is a diagrammatic view of a fuel-transfer system in accordance with the present invention showing a fuel conductor including a housing and a diverter valve (in phantom), the diverter valve including a valve member and a pressure-relief valve and being positioned to lie in the housing, the valve member being moved to a closed position substantially blocking the filler neck from the fuel tank, and the pressure-relief valve being in a non-venting position substantially blocking the filler neck from the fuel tank.
Figure 3:
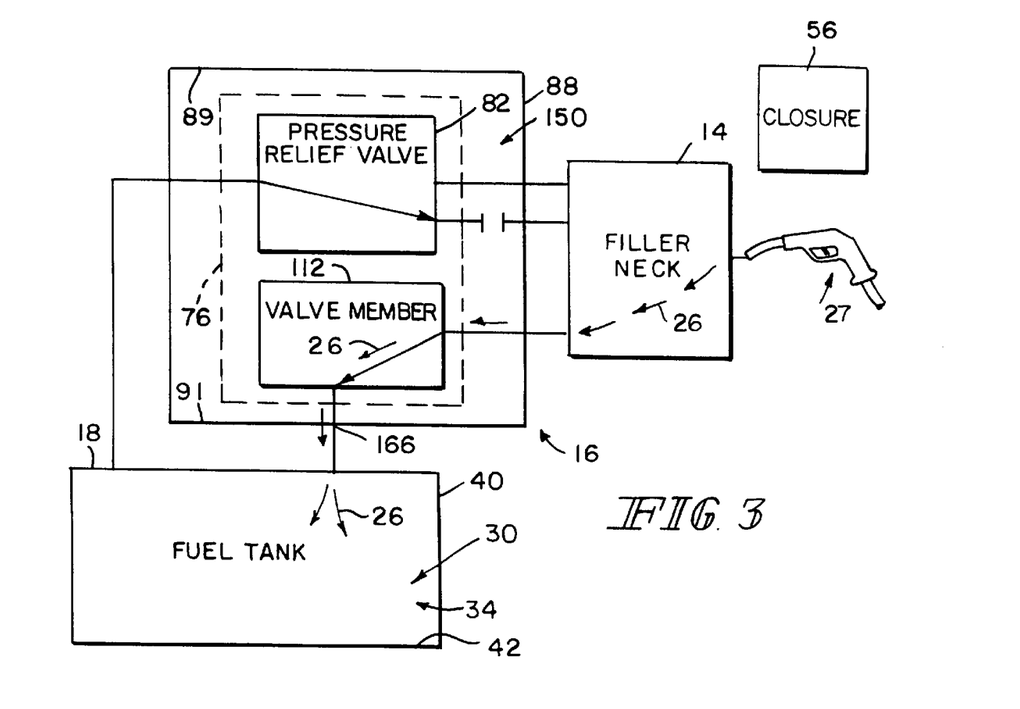
FIG. 3 is a view similar to FIG. 2 showing the valve member after it has been moved to an opened position during tank refueling so that liquid fuel is diverted into the fuel tank.

Fuel conductor 16 functions, for example, to divert the flow of liquid fuel 26 into fuel tank 18 from filler neck 14 to establish a barrier configured to block flow of liquid fuel and fuel vapor between filler neck 14 and fuel tank 18 at certain times, to vent pressurized fuel vapor 28 from vapor space 34 of fuel tank 18 when necessary, and to intercept and guide siphon tube 32 from filler neck 14 toward bottom wall 42 of fuel tank 18 when it is necessary to remove liquid fuel from fuel tank 18 using siphon tube 32. During refueling, fuel conductor 16 moves from a closed position, as shown in FIG. 2, to an opened position, as shown in FIG. 3, and diverts liquid fuel 26 dispensed into filler neck 14 into interior region 30 of fuel tank 18. After refueling, fuel conductor 16 moves back to the closed position shown in FIG. 2.

Figure 4:
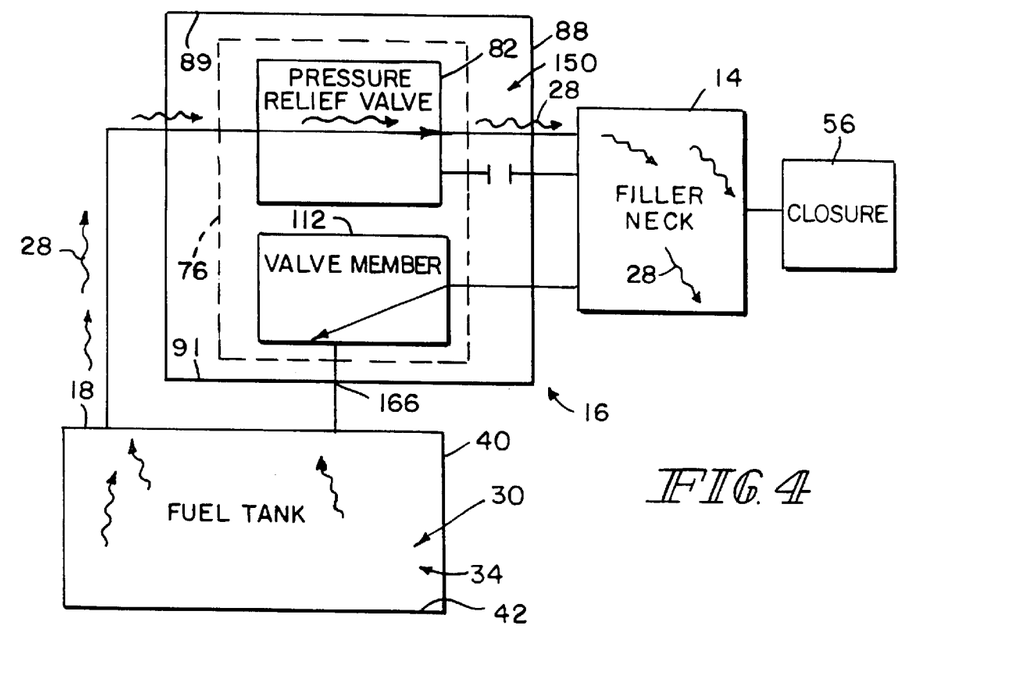
FIG. 4 is a view similar to FIG. 2 showing the valve member moved to the closed position and the pressure-relief valve moved to a venting position due to fuel vapor pressure in the fuel tank being at a level equal to or greater than a predetermined level so that pressurized fuel vapor can be vented through the filler neck to the atmosphere through a vent system provided in a closure mounted on the outlet end of the filler neck.

While fuel conductor 16 is in the closed position and fuel vapor 28 in vapor space 34 of fuel tank 18 is below a predetermined pressure level, fuel conductor 16 is also in a non-venting position and fuel conductor 16 establishes a liquid fuel and fuel vapor flow barrier between fuel tank 18 and filler neck 14 to prevent liquid fuel 26 and fuel vapor 28 from passing between filler neck 14 and fuel tank 18. If the fuel vapor pressure in vapor space 34 of fuel tank 18 is equal to or greater than the predetermined pressure level, fuel conductor 16 moves to a venting position and vents fuel vapor 28 from fuel tank 18 to filler neck 14 as shown in FIG. 4. When the pressure of fuel vapor 28 in vapor space 34 drops below the predetermined pressure level, fuel conductor 16 moves back to the non-venting position as shown in FIG. 3.

On occasion, it is necessary or convenient to remove liquid fuel 26 from fuel tank 18. To this end, siphon tube 32 can be inserted into fuel tank 18 and used to siphon or otherwise pump liquid fuel 26 from fuel tank 18 as shown in FIG. 5. Because liquid fuel 26 collects near bottom wall 42 of fuel tank 18, more liquid fuel 26 can be removed from fuel tank 18 if an inlet end of siphon tube 32 can be positioned to lie adjacent to bottom wall 42 of fuel tank 18.

Fuel conductor 16 is shown diagrammatically in FIGS. 2–5. Fuel conductor 16 diverts and guides siphon tube 32 as tube 32 is moved through filler neck 14 toward and into fuel tank 18. Fuel conductor 16 diverts siphon tube 32 toward bottom wall 42 of fuel tank 18 as it is being introduced into the interior region 30 of fuel tank 18 as shown in FIG. 5. When siphon tube 32 is inserted fully into fuel tank 18, the inlet end of siphon tube 32 is positioned to lie adjacent to bottom wall 42 of fuel tank 18 to enable more liquid fuel 26 to be removed from fuel tank 18.

Fuel conductor 16 includes a housing 88 formed to include a transfer channel 150 and an aperture 166. Fuel conductor 16 further includes a diverter valve 76 positioned to lie in transfer channel 150. Diverter valve 76 regulates and guides the flow of liquid fuel 26 and fuel vapor 28 through transfer channel 150 and intercepts and guides siphon tube 32 inserted from filler neck 14 into interior region 30 of fuel tank 18.

Diverter valve 76 includes a valve member 1 12 that is configured to substantially block transfer channel 150 while in a closed position when fuel is not being dispensed into filler neck 14 as shown in FIG. 2. However, during refueling, liquid fuel 26 introduced to filler neck 14 by a fuel-dispensing nozzle 27 enters housing 88 to move valve member 112 to an opened position as shown in FIG. 3. Valve member 112 intercepts and guides liquid fuel 26 from transfer channel 150 through aperture 166 into fuel tank 18. Thus, while in the opened position, valve member 112 guides liquid fuel 26 toward and through aperture 166 into fuel tank 18.

Diverter valve 76 also includes a pressure-relief valve 82 that is configured to substantially block transfer channel 150 while in the non-venting position, as shown in FIG. 2, and to vent fuel vapor 28 from fuel tank 18 to filler neck 14 while in the venting position as shown in FIG. 4. While fuel system 10 is not being refueled, pressures within vapor space 34 of fuel tank 18 should be maintained within a certain pressure range. Thus, when fuel vapor 28 within vapor space 34 reaches a predetermined pressure level, fuel vapor 28 should be released from vapor space 34. Therefore, when fuel vapor 28 in vapor space 34 reaches the predetermined pressure level, pressure-relief valve 82 moves to the venting position to relieve pressure in vapor space 34 of fuel tank 18 into filler neck 14 as shown in FIG. 4. When enough fuel vapor 28 is released from fuel tank 18 to release pressure below the predetermined level, pressure-relief valve 82 returns to the non-venting position as shown in FIG. 2.

Valve member 112 also intercepts and guides siphon tube 32 from filler neck 14 through fuel conductor 16 into fuel tank 18. Valve member 112 is adapted to divert a lead end 79 of siphon tube 32 from transfer channel 150 through aperture 166 into fuel tank 18 toward bottom wall 42 of fuel tank 18 as shown in FIG. 5. Housing 88 includes a top surface 89 and a bottom surface 91 facing toward bottom wall 42 of fuel tank 18. Aperture 166 is positioned in bottom surface 91 of housing 88 to direct siphon tube 32 toward bottom wall 42 of fuel tank 18. Thus, as lead end 79 of siphon tube 32 is inserted into filler neck 14 and fed through housing 88, valve member 112 intercepts and guides lead end 79 toward and through aperture 166.

When lead end 79 of siphon tube 32 exits aperture 166, it continues to be directed toward bottom wall 42 of fuel tank 18 by valve member 112. Thus, as siphon tube 32 is fed further into filler neck 14, lead end 79 moves toward bottom wall 42 of fuel tank 18. As siphon tube 32 is continuously fed, lead end 79 is positioned to lie substantially adjacent bottom wall 42 of fuel tank 18 as shown in FIG. 5. Thus, a mechanic or other person can siphon the bulk of liquid fuel 26 from fuel tank 18 because lead end 79 of siphon tube 32 is positioned to lie substantially adjacent bottom wall 42 of fuel tank 18.

Figure 6A:
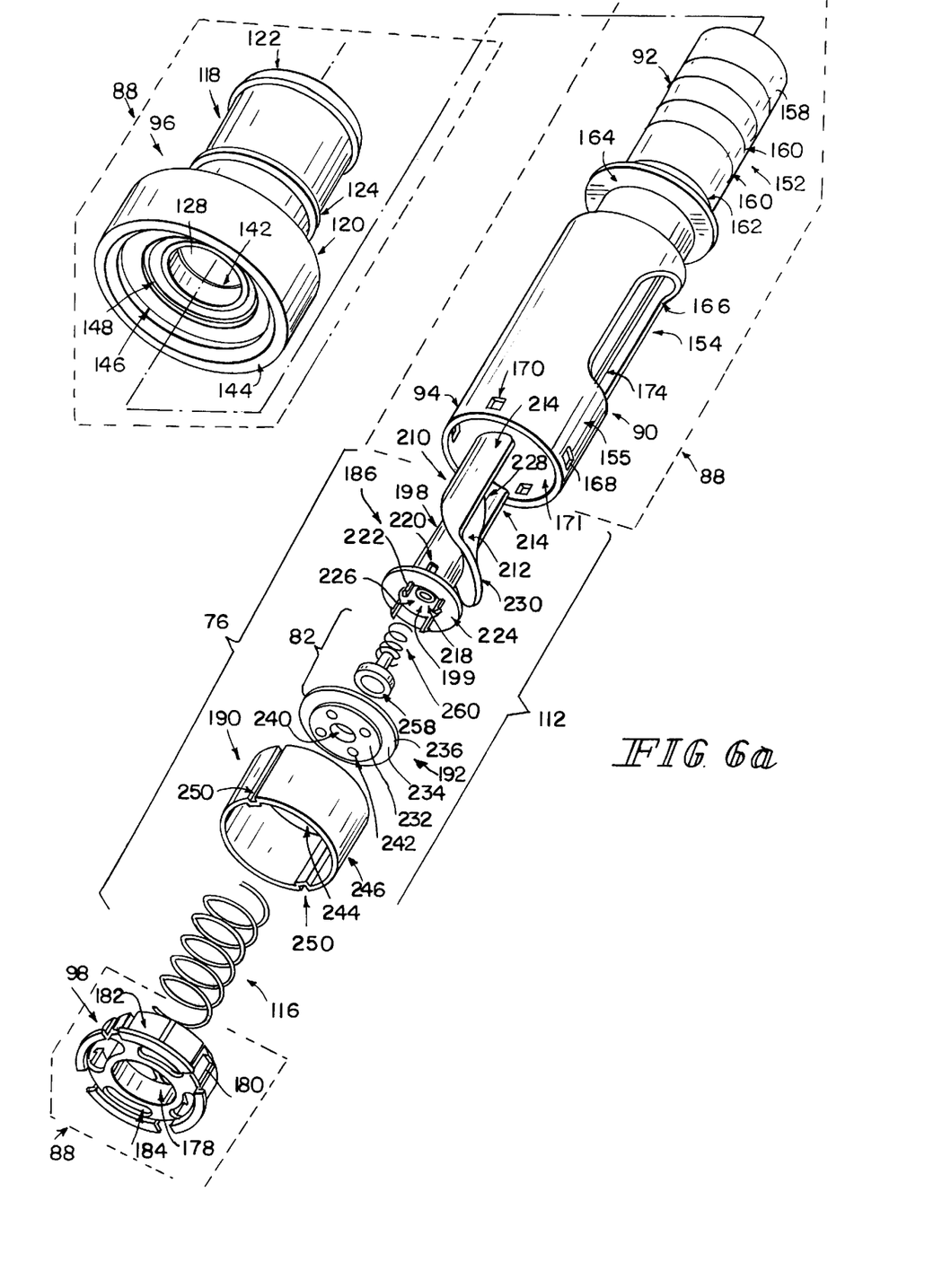
FIG. 6b is an end elevation view of the scoop-shaped guide member of FIG. 6a taken along line 6b—6b of FIG. 6c.
FIG. 6c is a side elevation view of the guide member of FIGS. 6a and 6b taken along line 6c—6c of FIG. 6b showing a central body portion, three of the four snap fingers coupled to the left end of the central body portion, and a scoop-shaped guide coupled to the right end of the central body portion and configured to guide a siphon tube passing through the housing into a fuel tank as shown in FIG. 9.
FIG. 6d is an end elevation view of the shuttle member of FIG. 6a taken along line 6d—6d of FIG. 6e showing the shuttle member formed to include four snap-receiving openings sized to receive the four snap fingers of the guide member.
FIG. 6e is a side elevation view of the shuttle member of FIGS. 6a and 6d taken along line 6e—6e of FIG. 6d.
Figure 7:
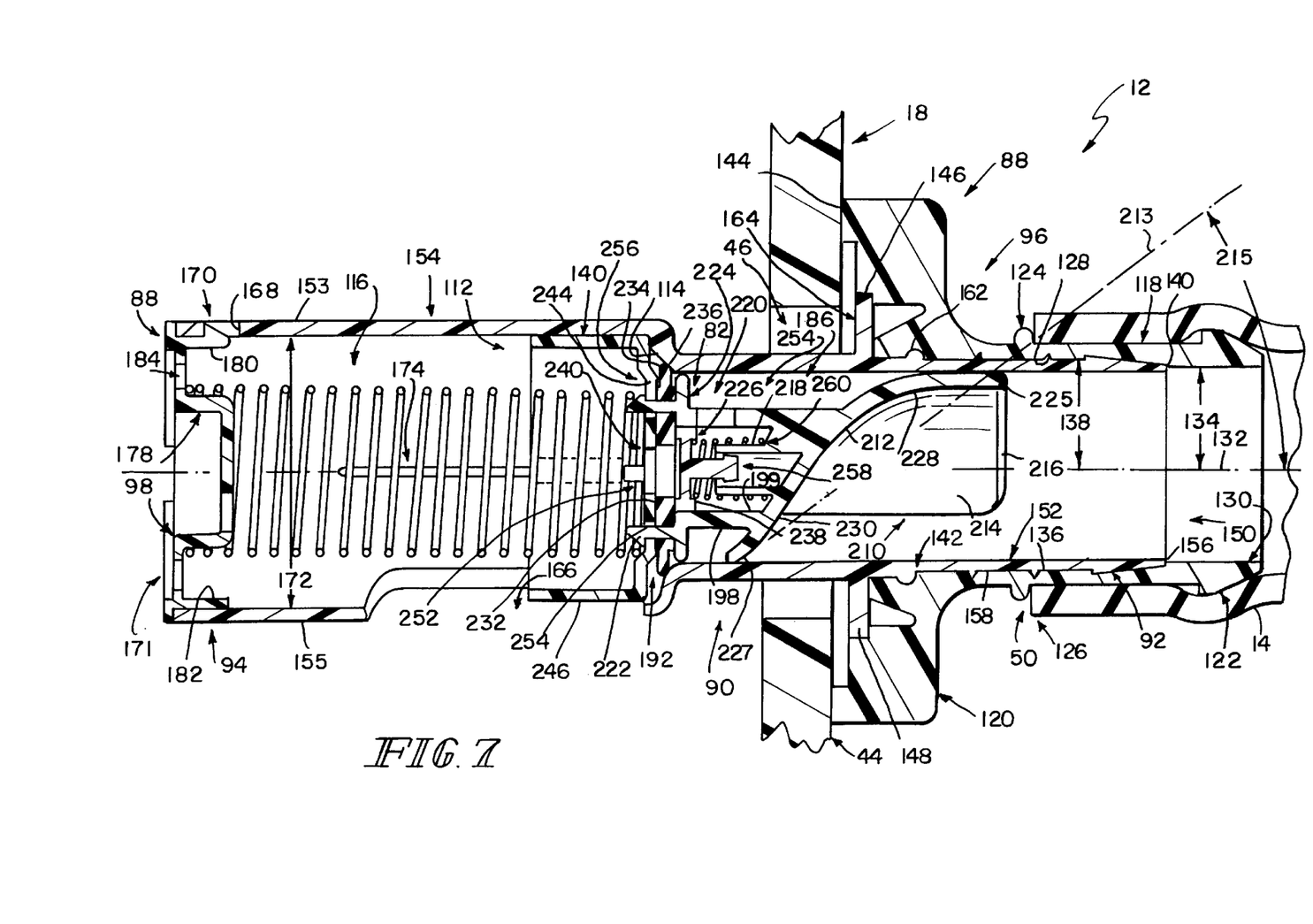
FIG. 7 is a cross-sectional view of the fuel tank, fuel conductor, and filler neck of FIG. 1 showing the diverter valve in a channel-closing position to block flow of liquid fuel and fuel vapor between the fuel tank and the filler neck.

In an illustrative embodiment, housing 88 is elongated, sleeve-like, and made of plastics material as shown in FIG. 6a. Housing 88 includes an inner housing member 90 having an outer end 92 and an inner end 94 spaced apart from outer end 92, a mounting member 96, and a retainer member 98. Mounting member 96 is coupled around outer end 92 of inner housing member 90 and retainer member 98 is coupled inside inner end 94 of inner housing member 90 as shown in FIG. 7. Housing 88 is illustratively installed in fuel tank inlet aperture 46, as shown in FIG. 7, so that inner end 94 of inner housing member 90 extends through inlet aperture 46 into fuel tank 18 and outer end 92 of inner housing member 90 extends out of fuel tank 18. Mounting member 96 engages and surrounds fuel inlet aperture 46 and mounts the remainder of housing 88 to fuel tank 18.

Figure 8:
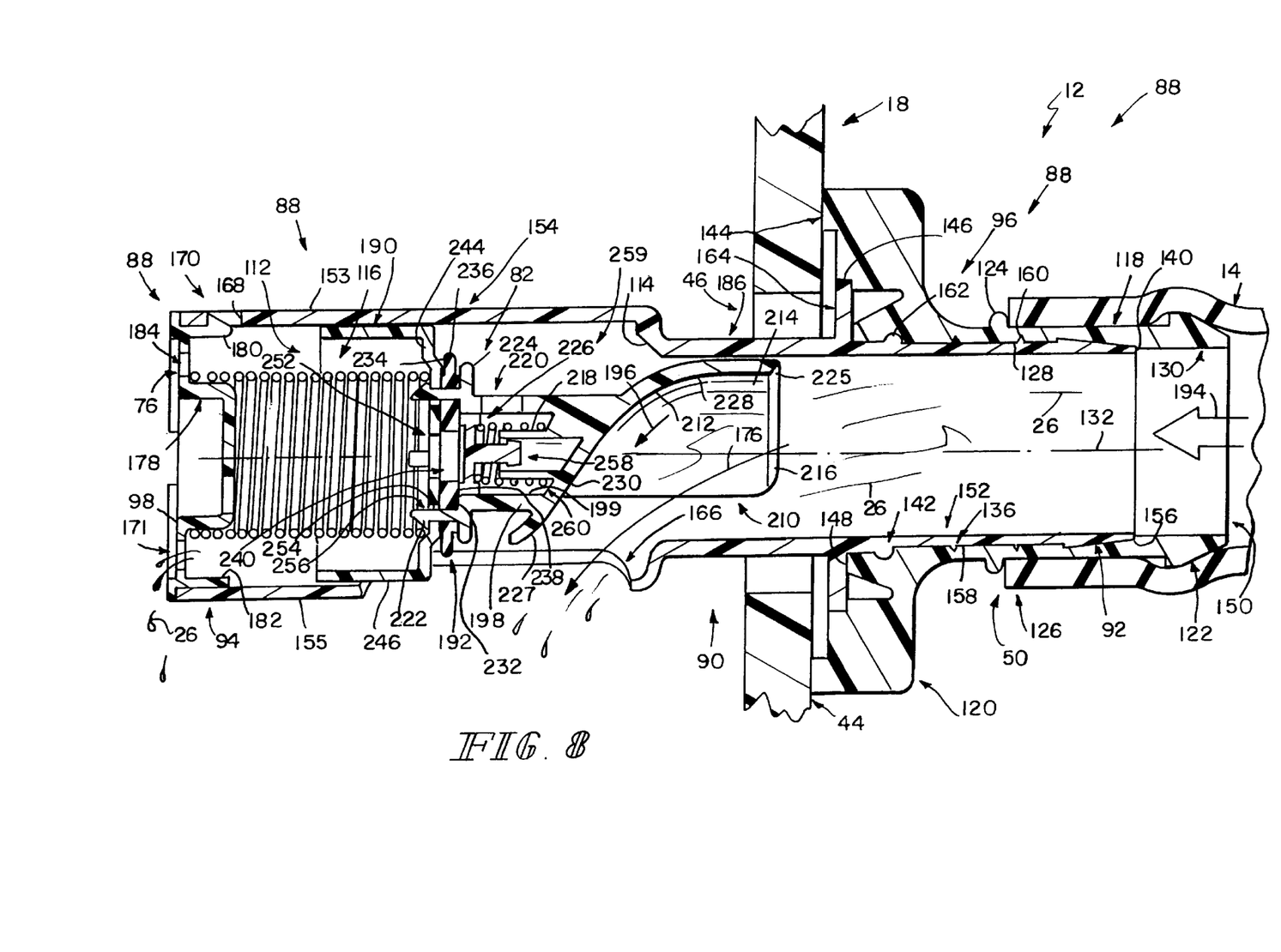
FIG. 8 is a cross-section view similar to FIG. 7 showing the diverter valve after it has been moved to a channel-opening position by a stream of liquid fuel passing through the filler neck during refueling and showing the scoop-shaped guide member intercepting and guiding the stream of liquid fuel passing from the filer neck through the fuel-transfer aperture into the fuel tank.

In an illustrative embodiment, diverter valve 76 is positioned to lie within housing 88 and includes valve member 112 and is slidable between a channel-closing position shown in FIG. 7 and a channel-opening position as shown in FIG. 8. Diverter valve 76 further includes a ramped valve scat 114 defined by inner housing member 90, and a spring 116 arranged to act against retainer member 98 of housing 88 and yieldably urge valve member 112 into engagement with ramped valve seat 114 of inner housing member 90.

Mounting member 96 functions to mount inner housing member 90 in a rigid fixed position to filler neck 14 and fuel tank 18. Mounting member 96 includes a mounting sleeve 118 and a mounting flange 120. Mounting sleeve 118 is press-fit onto outer end 92 of inner housing member 90 and press-fit within filler neck 14 as shown in FIG. 7. Mounting flange 120 is appended to mounting sleeve 118 and couples the remainder of housing 88 to fuel tank 18 by hot-plate welding mounting flange 120 to fuel tank 18 as shown in FIG. 7.

Mounting sleeve 118 includes a ramped collar 122 for securing mounting sleeve 118 within filler neck 14 and another collar 124 for abutting with an end 126 of filler neck 14 as shown in FIG. 7. Mounting sleeve 118 also includes an inner surface 128 having a first portion 130 spaced apart from a central axis 132 by a first distance 134, a second portion 136 spaced apart from central axis 132 by a second distance 138 that is greater than first distance 134, and an annular rim 140 therebetween. Second portion 136 defines a detent-receiving groove 142. Mounting flange 120 includes first, second, and third inner rims 144, 146, 148. First inner rim 144 is hot-plate welded to fuel tank 18.

Inner housing member 90 defines transfer channel 150 for the delivery of liquid fuel 26 through inner housing member 90. Inner housing member 90 includes a first portion 152 that is positioned to lie in mounting member 96, a second portion 154 positioned to lie in fuel tank 18, a first side 153, and a second side 155 spaced apart from first side 153. First portion 152 includes a rim 156 and an outer surface 158 having a plurality of annular ridges 160, an annular detent 162, and a collar 164. When first portion 152 is press-fit into mounting member 96, rim 156 abuts annular rim 140 of mounting member 96, annular ridges 160 grip and seal with inner surface 128 of mounting member 96, annular detent 162 mates with detent-receiving groove 142 of mounting sleeve 118, and collar 164 abuts second and third inner rims 146, 148 of flange 120 as shown in FIG. 7. Thus, inner housing member 90 is mounted to and substantially sealed with mounting member 96.

Second portion 154 of inner housing member 90 includes aperture 166 of housing 88, snap-rims 168 defining a plurality of snap-receiving openings 170, ramped valve seat 114, a valve-receiving opening 171, an inside diameter 172, and a pair of alignment fins 174. When valve member 112 is in the channel-opening position, aperture 166 cooperates with transfer channel 150 to define a fuel passageway 176 for the transfer of liquid fuel 26 and siphon tube 32 between housing 88 and fuel tank 18 as shown in FIGS. 8 and 9.

Retainer member 98 retains spring 116 within second portion 154 of inner housing member 90 and permits liquid fuel 26 and fuel vapor 28 to travel through inner end 94 of inner housing member 90. Retainer member 98 includes a spring seat 178, a plurality of snap-fingers 180, a plurality of alignment lugs 182, and a plurality of apertures 184. Valve member 112 is inserted into inner housing member 90 though valve-receiving opening 171. Next, spring 116 is inserted behind valve member 112. Retainer member 98 is then positioned to lie in valve-receiving opening 171 so that alignment lugs 182 are positioned to lie within second portion 154 of inner housing member 90, snap-fingers 180 engage snap-rims 168 to couple retainer member 98 to inner housing member 90, and spring 116 is positioned over spring seat 178 as shown in FIG. 7.

As previously mentioned, valve member 112 is movable between the channel-closing position shown in FIG. 7 and the channel-opening position shown in FIG. 8. Valve member 112 includes a guide member 186, pressure-relief valve 82 mounted to guide member 186, a shuttle member 190 coupled to guide member 186, and a seal 192 positioned to lie between guide member 186 and shuttle member 190. Spring 116 abuts shuttle member 190 and biases valve member 112 to the channel-closing position as shown in FIG. 7. When liquid fuel 26 enters housing 88 in direction 194 from filler neck 14 during refueling, liquid fuel 26 engages guide member 186 and moves valve member 12 to the channel-opening position against the bias provided by spring 116 as shown in FIG. 8. Guide member 186 diverts liquid fuel 26 from motion in direction 194 to motion in direction 196 through aperture 166 into fuel tank 18. Lesser amounts of liquid fuel 26 also exit through apertures 184 of retainer member 98 into fuel tank 18 as shown in FIG. 8.

Figure 9:
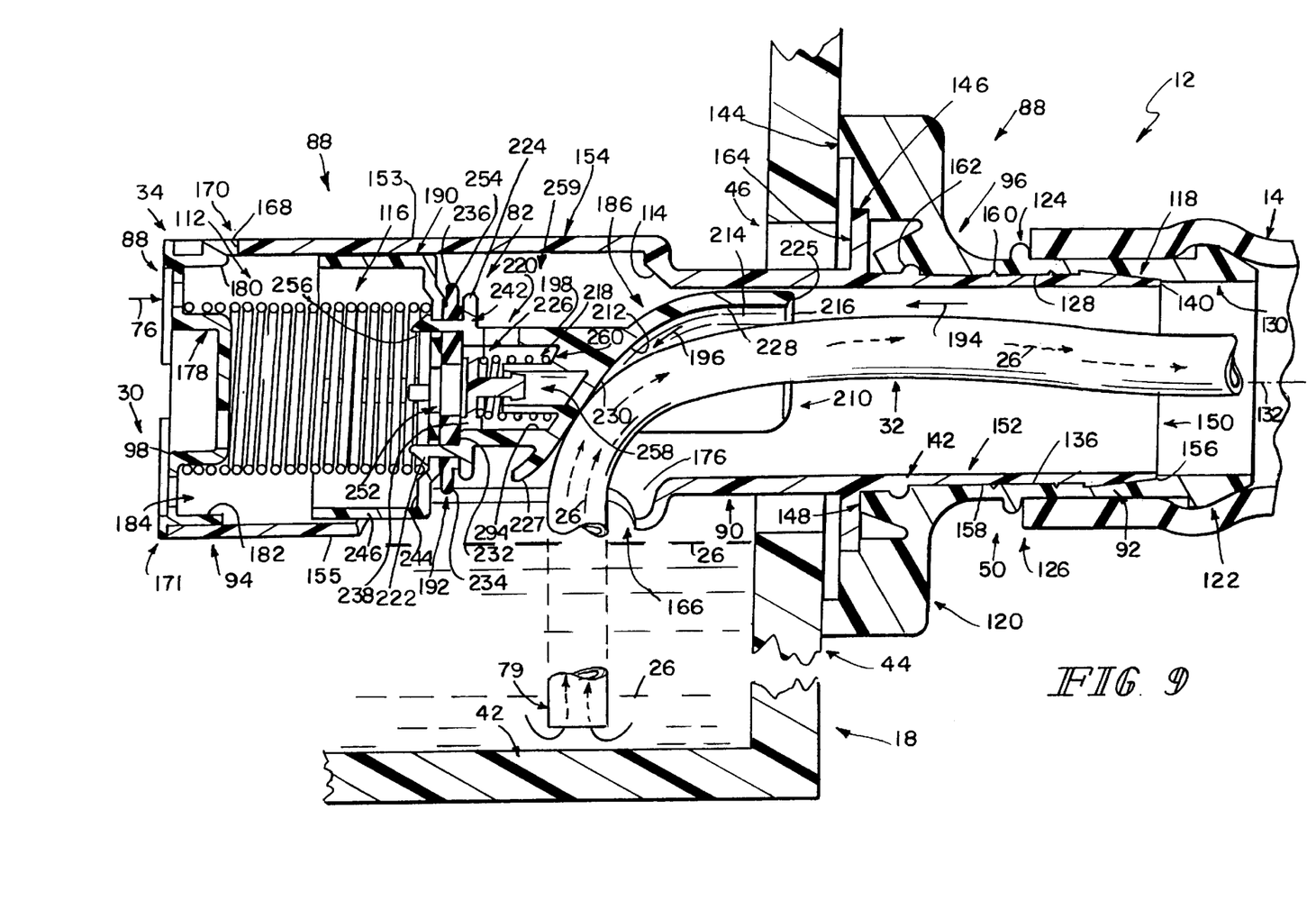
FIG. 9 is a cross-sectional view similar to FIG. 7 showing the lead end of the siphon tube fully inserted through the fuel conductor, the scoop-shaped guide member of the valve member having intercepted the lead end of the siphon tube and having directed it to lie substantially adjacent to the bottom wall of the fuel tank as the siphon tube was passed down through the filler neck and the fuel conductor into the fuel tank, and the siphon tube functioning to remove liquid fuel from the fuel tank.

When siphon tube 32 is inserted through filler neck 14 into housing 88 in direction 194, siphon tube 32 engages guide member 186 and moves valve member 112 to the channel-opening position as shown in FIG. 9. Guide member 186 diverts lead end 79 of siphon tube 32 from motion in direction 194 to motion in direction 196 through aperture 166 into fuel tank 18 toward bottom wall 42. Thus, guide member 186 intercepts the flow of liquid fuel 26 through transfer channel 150 and guides the flow of liquid fuel 26 toward aperture 166 and supports pressure-relief valve 82. Similarly, guide member 186 intercepts lead end 79 of siphon tube 32 and guides it toward bottom wall 42 of fuel tank 18.

Figures 6B, 6C:
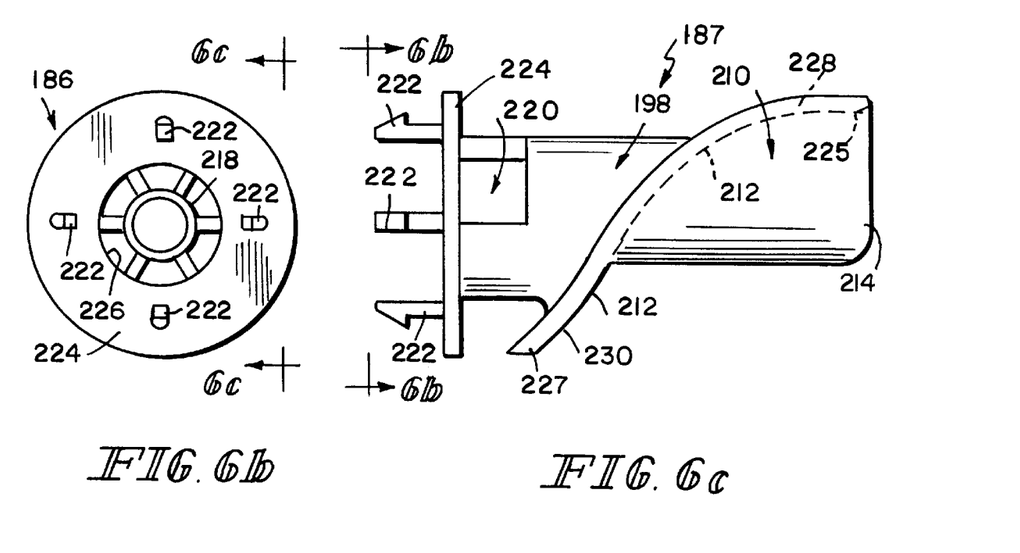

Guide member 186 includes a base 198, a scoop-shaped guide 210 having a guide surface 212, curved side walls 214, and a beveled lead edge 216, a spring seat 218, two openings 220 formed in base 198 acting as outlets, a valve chamber 199 formed in base 198, a plurality of snap-fingers 222, and a collar 224 having an aperture 226 acting as an inlet as shown in FIGS. 6a—6c. Guide 210 is coupled to base 198 and intercepts and guides liquid fuel 26 and lead end 79 of siphon tube 32 into fuel tank 18.

Figure 10:
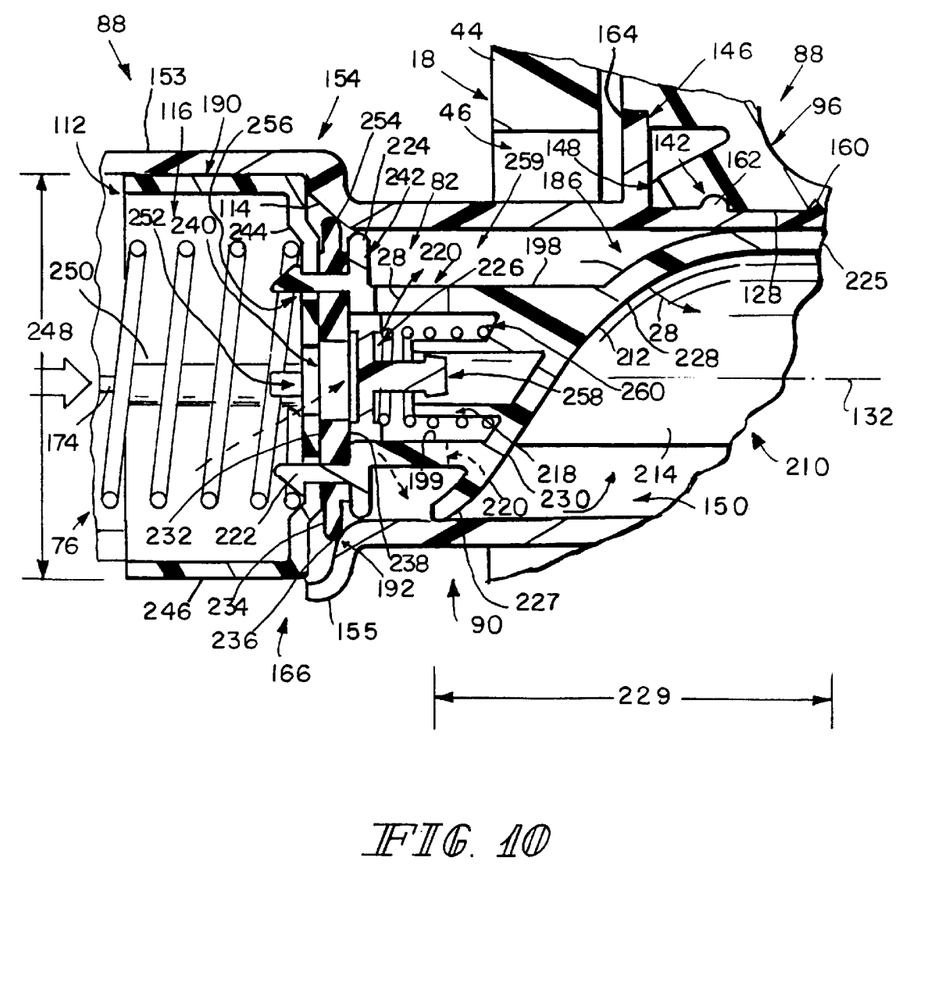
FIG. 10 is an enlarged cross-sectional view similar to FIG. 7 showing the pressure-relief valve in a venting position while the fuel vapor in the fuel tank is at a pressure level equal to or greater than a predetermined pressure level so that pressurized fuel vapor is discharged from the fuel tank through the filler neck.

Guide surface 212 is serpentine shaped and non-orthogonal to central axis 132. Guide surface includes a first end 225 positioned to lie adjacent to first side 153 of inner housing member 90 and a second end 227 positioned to lie adjacent to second side 155 of inner housing member 90 and spaced apart along central axis 132 from first end 225 by a distance 229 as shown in FIG. 10.

Guide surface 212 diverts the flow of liquid fuel and lead end 79 of siphon tube 32 from movement in direction 194 to direction 196. Guide surface 212 defines a guide axis 213 that cooperates with central axis 132 to define an included angle 215 that is less than ninety (90) degrees. Because liquid fuel 26 and lead end 79 of siphon tube 32 travel substantially parallel to central axis 132 before striking guide surface 212, guide surface 212 diverts the flow of liquid fuel 26 and lead end 79 of siphon tube 32 without engaging guide surface 212 at a right angle. This diversion provides a smooth transition from transfer channel 150 to aperture 166 which substantially prevents lead end 79 of siphon tube 32 from becoming "snagged" while moving through housing 88 toward bottom wall 42 of fuel tank 18.

Guide surface 212 includes first and second curved portions 228, 230 for providing the smooth transition from transfer channel 150 to aperture 166 as discussed above. First curved portion 228 "scoops" the flow of liquid fuel 26 and movement of lead end 79 of siphon tube 32 from motion in direction 194 and diverts the flow and movement to direction 196. Second curved portion 230 continues the transition and guides the flow of liquid fuel 26 and movement of lead end 79 of siphon tube 32 away from second side 155 of housing member 90 located on second portion 154 as shown in FIGS. 8 and 9. Second curved portion 230 also detours siphon tube 32 away from pressure-relief valve 82 during retraction of siphon tube 32 to prevent catching of siphon tube 32 during removal.

Seal 192 substantially blocks the flow of vapor and fuel through transfer channel 150 from fuel tank 18 while valve member 112 is in the channel-closing position as shown in FIG. 7. This blocking substantially prevents liquid fuel 26 and fuel vapor 28 from moving from fuel tank 18 to transfer channel 150. However, when valve member 112 is in the channel-opening position as shown in FIG. 8, seal 192 does not substantially block transfer channel 150 from fuel tank 18 and enables liquid fuel 26 and fuel vapor 28 to travel between filler neck 14 and fuel tank 18.

As shown in FIG. 7, seal 192 is coupled between guide member 186 and shuttle member 190. Seal 192 is disk-shaped, made of flexible fluorocarbon elastomer, and includes a body portion 232, a flexible portion 234 coupled to body portion 232, and a circular rib 236 coupled to flexible portion 234. Body portion 232 includes a valve seat 238, an aperture 240, and a plurality of snap-receiving openings 242. Flexible portion 234 is resilient and permits circular rib 236 to wipe up ramped valve seat 114 as valve member 112 moves from the channel-opening position to the channel-closing position to substantially block transfer channel 150 from fuel tank 18.

Figure 6D:
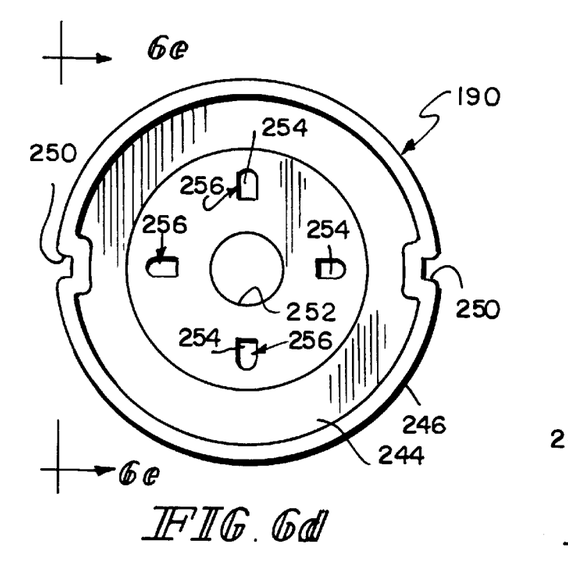
Figure 6E:
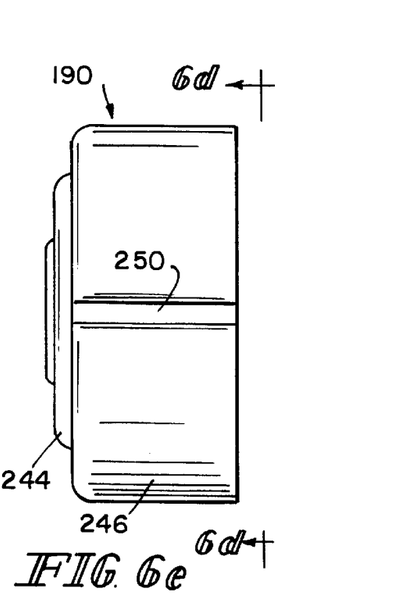

Shuttle member 190 guides the movements of valve member 112 within housing 88. As shown in FIGS. 6a, 6d, and 6e, shuttle member 190 is cup-shaped and includes a base portion 244, a cylindrical wall 246 having an outside diameter 248 and a plurality of fin-receiving grooves 250, an aperture 252, and a plurality of snap rims 254 defining a plurality of snap-receiving openings 256.

Shuttle member 190 and seal 192 are coupled to guide member 186 by first placing seal 192 over snap-fingers 222 of guide member 186 so that snap-fingers 222 extend through snap-receiving openings 242 of seal 192. Similarly, shuttle member 190 is placed over snap-fingers 222 of guide member 186 so that snap-fingers 222 extend through snap-receiving openings 256 of shuttle member 190 and engage and lock with snap rims 254 as shown in FIG. 7. Snap-fingers 222 also act as a spring seat for spring 116 and hold spring 116 in position as shown in FIG. 7.

Outside diameter 248 of shuttle member 190 is slightly less than inside diameter 172 of second portion 154 of inner housing member 90. This allows shuttle member 190 to slide in second portion 154 of inner housing member 90 while valve member 12 moves between the channel-opening and channel-closing positions. Furthermore, alignment fins 174 of inner housing member 90 ride in fin-receiving grooves 250 of shuttle member 190. This relationship aligns shuttle member 190 and the remainder of valve member 112 so that guide member 186 guides liquid fuel 26 and siphon tube 32 toward aperture 166. Thus, shuttle member 190 guides the remainder of valve member 112 during movement from the channel-closing position, as shown in FIG. 7, to the channel-closing position as shown in FIG. 8

Pressure-relief valve 82 is positioned to lie in valve chamber 199 and regulates the flow of fuel vapor between fuel tank 18 and filler neck 14. When fuel vapor 28 in fuel tank 18 reaches a predetermined pressure level (approximately 13 inches of water) pressure-relief valve 82 moves from a non-venting position, as shown in FIG. 7, to a venting position as shown in FIG. 10. Pressure-relief valve 82 includes a valve member 258, valve scat 238, and a spring 260 positioned to lie over spring seat 218 of guide member 186 between valve member 258. Spring 260 biases valve member 258 in direction 194 to the non-venting position against valve seat 238 of body portion 232 of seal 192. Thus, when fuel tank 18 is at a pressure level lower than the predetermined level, valve member 258 remains in the non-venting position and engages valve scat 238 to substantially block fuel tank 18 from transfer channel 150 and filler neck 14 when valve member 112 is in the channel-closing position as shown in FIG. 7.

When fuel tank 18 is at a pressure level equal to or greater than the predetermined level, valve member 258 moves away from valve seat 238 to the venting position against the bias provided by spring 260 as shown in FIG. 10. Thus, when fuel tank 18 is at a pressure equal to or greater than the predetermined level and valve member 258 is in the opened position, fuel vapor 28 will vent from fuel tank 18 through transfer channel 150 to filler neck 14.

When pressure-relief valve 82 is in the venting position, fuel vapor 28 travels from fuel tank 18 to transfer channel 150 to filler neck 14 through shuttle member 190, seal 192, and guide member 186. Fuel vapor 28 enters housing 88 from fuel tank 18 through aperture 166 of inner housing member 90 and apertures 184 in retainer member 98. While in the venting position, fuel vapor 28 flows through respective apertures 252, 240, 226, of shuttle member 190, seal 192, and guide member 186, through openings 220 of guide member 186, and past guide 210 into transfer channel 150 and filler neck 14. Base 198 of valve member 112 and housing 88 define a movable chamber 259 into which openings 220 dump fuel vapor during venting. According to an alternative embodiment of the present invention, the diverter valve does not include a pressure-relief valve.

Mounting member 96 is made of electrically conductive HDPE (high density polyethylene) and inner housing member 90 is made of electrically conductive acetal. Because mounting member 96 and inner housing member 90 are made of electrically conductive material, housing 88 is electrically conductive. Because housing 88 is mounted between fuel tank 16 and filler neck 14 and is conductive, housing 88 provides an electrical path between fuel tank 16 and filler neck 14. Thus, static charge that develops in fuel tank 16 can pass through housing 88 to filler neck 14 and the vehicle body (not shown). Thus, a conductive path between fuel tank 16 and the vehicle body has been provided by housing 88 and filler neck 16.

Figure 11A:
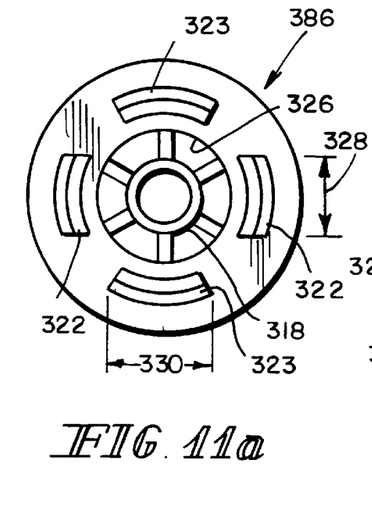
FIG. 11a is an end elevation view of a guide member including a pair of snap fingers having a first size and another pair of snap fingers having a larger second size.
Figure 11B:
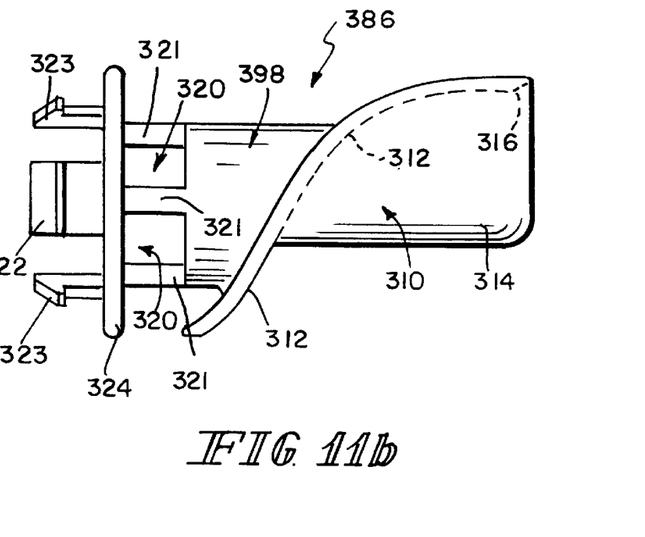
FIG. 11b is a side elevation view of the guide member of FIG. 11a showing the guide member including the first pair of small size snap fingers and one of the second pair of large size snap fingers.

A presently preferred embodiment of a guide member 386 is shown in FIGS. 11a. Guide member 386 includes a body portion 398, a scoop-shaped guide 310 having a guide surface 312, curved side walls 314, and a beveled lead edge 316, a spring seat 318, four ribs 321 defining four openings 320 in body portion 398, a first pair of snap-fingers 322, a second pair of snap-fingers 323, and a collar 324 having an aperture 326. First pair of snap fingers 322 have a width 328 and second pair of snap fingers 323 have a width 330 that is greater than width 328 of first pair of snap fingers 322. Guide member 386 functions in a manner similar to guide member 186.

Figure 11C:
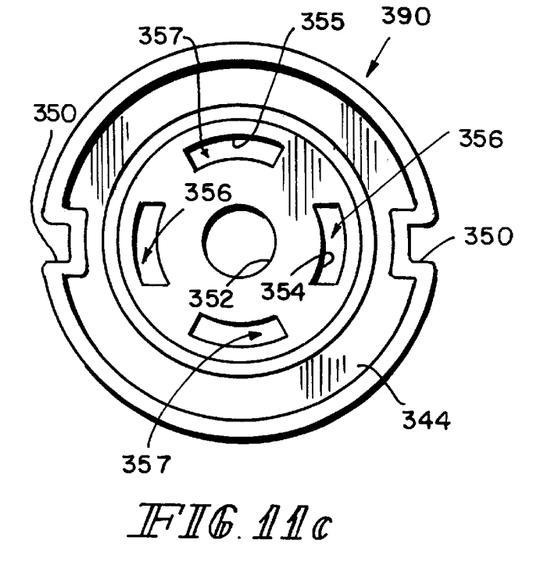
FIG. 11c is an end elevation view of a shuttle member configured to mate with the guide member of FIGS. 11a and 11b and formed to include a first pair of small snap-receiving openings sized to receive the first pair of small size snap fingers of the guide member of FIG. 11a and a second pair of large snap-receiving openings sized to receive the second pair of large size snap fingers.
Figure 11D:
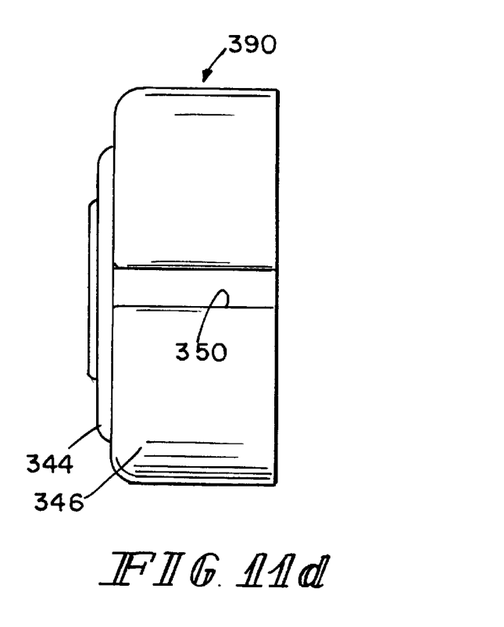
FIG. 11d is a side elevation view of the shuttle member of FIG. 11c.

A presently preferred embodiment of a shuttle member 390 mates with guide member 386 and is shown in FIGS. 11c and 11d. Shuttle member 390 is cup-shaped and includes a base portion 344, a cylindrical wall 346 having a plurality of fin-receiving grooves 350, an aperture 352, a first pair of snap rims 354 defining a first pair of snap-receiving openings 356, and a second pair of snap rims 355 defining a second pair of snap-receiving openings 357. First pair of snap-receiving openings 356 are sized and shaped to receive first pair of snap-fingers 322 and second pair of snap-receiving openings 357 are sized and shaped to receive second pair of snap fingers 323. Shuttle member 390 functions in a manner similar to shuttle member 190.

Snap fingers 322, 323 and snap-receiving openings 356, 357 are "indexed" to aid in aligning guide member 386 with shuttle member 390 during assembly. Second pair of snap fingers 323 are sized to be larger than first pair of snap-receiving openings 356 so that only first pair of snap fingers 323 will fit within first pair of snap-receiving openings 356. This indexing helps insure that fin-receiving grooves 350 will align properly with scoop-shaped guide 310 during assembly of shuttle member 390, seal 192, and guide member 386.

Although this invention has been described in detail with reference to certain embodiments, variations and modifications exist within the scope and spirit of the invention as described and as defined in the following claims.

What is claimed is:

1. A fuel-transfer system for communicating fuel into a fuel tank including a top wall and a bottom wall spaced apart from the top wall, the system comprising a filler neck configured to receive fuel and a fuel conductor adapted to be coupled to a fuel tank and filler neck, the fuel conductor including a housing and a diverter valve, the housing being formed to include an inlet in communication with the filler neck, an outlet in communication with the fuel tank, and a transfer channel extending between the inlet and outlet, the diverter valve being positioned to lie in the transfer channel for movement along a central axis between a closed position substantially blocking the inlet from the outlet and an opened position permitting communication between the inlet and outlet through the transfer channel, the diverter valve being adapted to intercept and guide a tube moving through the filler neck into the transfer channel toward a bottom wall of the fuel tank.

2. The fuel-transfer system of claim 1, wherein the diverter valve includes a base and a pressure-relief valve coupled to the base for movement between a closed position blocking the flow of fuel vapor from the fuel tank through the inlet to an opened position permitting the flow of fuel vapor from the fuel tank through the inlet.

3. The fuel-transfer system of claim 2, wherein the base is formed to include an inlet, an outlet, and a valve chamber extending between the inlet and outlet of the base, the pressure-relief valve is positioned to lie in the valve chamber for movement between the closed position and the opened position.

4. The fuel-transfer system of claim 3, wherein the diverter valve and the housing cooperate to define a movable chamber therebetween and the outlet of the base communicates with the movable chamber.

5. The fuel-transfer system of claim 2, wherein the base includes a spring mount, the pressure-relief valve includes spring positioned to lie on the spring mount and a valve member biased to the closed position by the spring.

6. The fuel-transfer system of claim 1, wherein the diverter valve includes a base and a shuttle coupled to the base to direct the movement of the diverter valve in the housing.

7. The fuel-transfer system of claim 6, wherein the diverter valve further includes a snap-finger coupled to the base, the shuttle is formed to include an opening, and the snap finger is positioned to lie in the opening of the shuttle to couple the shuttle to the base of the diverter valve.

8. The fuel-transfer system of claim 6, wherein the diverter valve further includes a seal positioned to lie between the base and the shuttle and the housing is formed to include a valve seat arranged to engage the seal when the diverter valve is in the closed position.

9. The fuel-transfer system of claim 6, wherein the housing includes at least one fin, the shuttle is formed to include a groove configured to receive the fin to direct the movement of the diverter valve between the closed position and the opened position.

10. The fuel-transfer system of claim 1, wherein the diverter valve includes a base, a shuttle coupled to the base, and a seal positioned to lie between the base and the shuttle and the housing is formed to include a valve seat arranged to engage the seal when the diverter valve is in the closed position.

11. The fuel-transfer system of claim 10, wherein the shuttle is formed to include at least one opening, the seal is formed to include at least one opening, the diverter valve includes a snap finger coupled to the base and positioned to lie in the openings of the shuttle and seal to couple the shuttle and seal to the base.

12. The fuel-transfer system of claim 1, wherein diverter valve includes a base and a seal coupled to the base and the housing is formed to include a valve seat arranged to engage the seal when the diverter valve is in the closed position.

13. The fuel-transfer system of claim 12, wherein the seal is formed to include a valve seat defining an aperture, the diverter valve further includes a pressure-relief valve movable between a closed position in engagement with the valve seat of the seal blocking the flow of fuel vapor through the aperture to an opened position permitting the flow of fuel vapor through the aperture.

14. The fuel-transfer system of claim 1, wherein the diverter valve includes a curved portion adapted to guide the tube.

15. The fuel-transfer system of claim 1, wherein the diverter valve includes a first curved portion that curves in a first direction and a second curved portion that curves in a second direction generally opposite to the first direction forming a generally S-shaped arrangement adapted to guide the tube.

16. The fuel-transfer system of claim 1, wherein the diverter valve includes a pair of curved side walls and a guide wall positioned to lie between the curved side walls, the curved side walls and the guide wall are adapted to guide the tube.

17. The fuel-transfer system of claim 16, wherein the curved side walls cooperate to define a beveled lead edge.

18. The fuel-transfer system of claim 16, wherein the guide wall includes a first curved portion that curves in a first direction and a second curved portion that curves in a second direction generally opposite to the first direction forming a generally S-shaped arrangement adapted to guide the tube.

19. A fuel-transfer system for communicating fuel into a fuel tank including a top wall and a bottom wall spaced apart from the top wall, the system comprising, a filler neck configured to receive fuel and a fuel conductor adapted to be coupled to a fuel tank and filler neck, the fuel conductor including a housing and a diverter valve, the housing being formed to include an inlet in communication with the filler neck, an outlet in communication with the fuel tank, and a transfer channel extending between the inlet and outlet, the diverter valve being positioned to lie in the transfer channel for movement along a central axis between a closed position substantially blocking the inlet from the outlet and an opened position permitting communication between the inlet and outlet through the transfer channel, the diverter valve including a base and a guide surface adapted to intercept and guide a tube moving through the filler neck into the transfer channel toward a bottom wall of the fuel tank.

20. The fuel-transfer system of claim 19, wherein the guide surface and the central axis cooperate to define an included angle therebetween that is less than ninety degrees.

21. The fuel-transfer system of claim 19, wherein the guide surface includes a first curved portion that curves in a first direction and a second curved portion that curves in a second direction generally opposite to the first direction forming a generally S-shaped arrangement adapted to guide the tube.

22. The fuel-transfer system of claim 19, wherein the diverter valve further includes a pressure-relief valve coupled to the base for movement between a closed position blocking the flow of fuel vapor from the fuel tank to the inlet and an opened position permitting the flow of fuel vapor from the fuel tank to the inlet.

23. The fuel-transfer system of claim 19, wherein the diverter valve includes a seal coupled to the base that blocks the inlet from the outlet when the diverter valve is in the closed position and a spring configured to bias the base to the closed position.

24. The fuel-transfer system of claim 19, wherein the housing is made of an electrically conductive material.

25. A fuel-transfer system for a fuel system of a vehicle including a filler neck and a fuel tank having a top wall and a bottom wall spaced apart from the top wall, the fuel-transfer system comprising a tube and a fuel conductor including a housing and a diverter valve positioned to lie in the housing, the housing being formed to include an inlet and an outlet, the diverter valve configured to intercept and guide the tube through the outlet of the housing into a fuel tank.

26. The fuel-transfer system of claim 25, wherein the outlet of the housing is adapted to open toward a bottom wall of the fuel tank.

27. The fuel-transfer system of claim 25, wherein the housing is formed to include a transfer channel extending between the inlet and the outlet, the diverter valve is movable between a closed position substantially blocking the inlet from the outlet and an opened position directing at least one of fuel and the tube moving into the inlet through the outlet into the fuel tank.

28. The fuel-transfer system of claim 25, wherein the diverter valve includes a base and a serpentine-shaped guide surface adapted to direct the tube.

29. The fuel-transfer system of claim 25, wherein the housing includes a first side, a second side spaced apart from the first side, and a central axis, the diverter valve includes a base and a guide surface including a first end positioned to lie adjacent the first side of the housing and a second end positioned to lie adjacent to the second side of the housing, the first end of the guide surface is spaced apart from the second end of the guide surface along the central axis.

30. The fuel-transfer system of claim 25, wherein the diverter valve includes a base and a pressure-relief valve coupled to the base.

31. The fuel-transfer system of claim 25, wherein the housing is made of an electrically conductive material.

32. A fuel-transfer system for use with a fuel tank, the system comprising
- a housing formed to include an inlet, an outlet, and a channel extending between the inlet and the outlet and
- a diverter valve positioned to lie in the channel for movement between a closed position normally blocking the flow of fuel between the inlet and outlet and an opened position permitting the flow of fuel from the inlet to the outlet during refueling to enable fuel to flow through the housing into a fuel tank, the diverter valve including a base and a pressure-relief valve coupled to the base for movement between a closed position normally blocking the flow of vapor from the fuel tank to the inlet and an opened position permitting the flow of vapor from the fuel tank to the inlet, the diverter valve being adapted to intercept and guide at least one of fuel in a tube through the housing into a fuel tank through the outlet.

33. The fuel-transfer system of claim 32, wherein the diverter valve further includes a seal coupled to the base that engages the housing while the diverter valve is in a closed position.

34. The fuel-transfer system of claim 32, wherein the pressure-relief valve includes a valve member and a spring positioned to lie between the base of the diverter valve and the valve member of the pressure-relief valve.

35. The fuel-transfer system of claim 32, wherein the diverter valve includes a spring positioned to lie between the base and the housing to bias the base to the closed position.

36. The fuel-transfer system of claim 32, wherein the housing is made of an electrically conductive material.

* * * * *